US012686290B2

(12) United States Patent
Baskakow et al.

(10) Patent No.: US 12,686,290 B2
(45) Date of Patent: Jul. 21, 2026

(54) BEHAVIORAL PATTERN RECOGNITION TO INITIATE A CHARGING PROCESS

(71) Applicant: AUDI AG, Ingolstadt (DE)

(72) Inventors: Kerstin Baskakow, Sappenfeld (DE); Matthias Schneider, Schernfeld (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/604,392

(22) Filed: Mar. 13, 2024

(65) Prior Publication Data

US 2024/0308368 A1     Sep. 19, 2024

(30) Foreign Application Priority Data

Mar. 16, 2023     (DE) .......................... 102023106569.6

(51) Int. Cl.
| | |
|---|---|
| *G06V 20/59* | (2022.01) |
| *B60L 53/16* | (2019.01) |
| *B60L 53/37* | (2019.01) |
| *B60L 53/60* | (2019.01) |

(52) U.S. Cl.
CPC .............. B60L 53/37 (2019.02); B60L 53/16 (2019.02); G06V 20/597 (2022.01); B60L 53/60 (2019.02)

(58) Field of Classification Search
CPC .......... B60L 53/37; B60L 53/16; B60L 53/60; B60L 53/65; G06V 20/597; Y02T 10/70; Y02T 10/7072; Y02T 90/12
See application file for complete search history.

(56) References Cited

U.S. PATENT DOCUMENTS

| | | | |
|---|---|---|---|
| 2018/0009446 A1* | 1/2018 | Ricci | ................... G07B 15/063 |
| 2020/0009977 A1 | 1/2020 | Park | |
| 2021/0101680 A1* | 4/2021 | Naderi | ................. H02J 50/402 |

FOREIGN PATENT DOCUMENTS

| | | |
|---|---|---|
| CN | 110217132 A | 9/2019 |
| DE | 102012021518 A1 | 5/2014 |
| DE | 102018205001 A1 | 10/2019 |
| DE | 102020004361 A1 | 10/2020 |
| DE | 102021212033 A1 | 4/2023 |
| EP | 3747688 A1 | 12/2020 |

* cited by examiner

*Primary Examiner* — Michael C Zarroli
(74) *Attorney, Agent, or Firm* — Seed Intellectual Property Law Group LLP

(57)     ABSTRACT
A method for initiating a charging process of an electrically drivable vehicle parked at a charging space by an automated charging system. The method includes determining a charging intention of a user in an automated manner based on performing behavioral pattern recognition of a behavioral pattern of the user including at least one movement of the user, authenticating the charging process, and after the authenticating, initiating the charging process by the automated charging system.

14 Claims, 1 Drawing Sheet

BEHAVIORAL PATTERN RECOGNITION TO INITIATE A CHARGING PROCESS

BACKGROUND

Technical Field

The disclosure relates to a method for initiating a charging process of an electrically drivable vehicle by an automated charging system and to a vehicle arrangement with at least one electrically driven vehicle and at least one charging system.

Description of the Related Art

To electrically charge traction batteries or energy storage devices of electrically drivable vehicles, such as, for example, electric vehicles or hybrid vehicles, charging piles and charging stations are currently used, where the driver must independently connect the vehicle using a charging plug. A market-ready automation of the coupling process between the charging station and the on-board charging socket is currently not available.

When it comes to the technical implementation of automated charging systems for vehicles, communication between a charging station, the vehicle to be charged and the automated charging system or charging robot is particularly technically challenging. Authentication is still required to initiate a charging process at a charging station. This authentication usually takes place on a control display of the charging station. For example, the driver can give permission to charge the vehicle using a charging card from a charging service provider, a credit card or a QR code that must be scanned with a smartphone. Although automated authentication processes are possible, the driver still has to manually connect the charging plug to the vehicle's charging socket and initiate the charging process manually.

BRIEF SUMMARY

Embodiments of the present disclosure provide a method and a vehicle arrangement through which at least an automated initiation of a charging process is made possible without a communication link between the charging system and the vehicle.

The method according to the disclosure is used to initiate a charging process of an electrically drivable vehicle by an automated charging system. In one step, the vehicle is parked at a charging space. Furthermore, a charging intention is determined in an automated manner based on behavioral pattern recognition using measurement data from sensors in the charging system. By sensorily monitoring the behavior of the vehicle and/or the driver, a charging request or charging intention can be estimated by a controller of the charging system. In a further step, the charging process is authenticated. This can be implemented manually by the driver or by the vehicle in an automated manner. Once authentication has taken place, the charging process is initiated by the automated charging system.

Depending on the configuration, alternatively or in addition to the driver of the vehicle, a user or operator of the vehicle, particularly in the case of automated vehicles, can authorize the charging process or indicate a charging intention to the charging system.

Initiating the charging process can be configured as a release of charging power for a vehicle that is already coupled via a charging cable or as a control of a robot arm or actuator for coupling a charging plug to a charging socket and then switching on the charging power. The method can therefore be used in semi-automated charging processes or in fully automated charging processes. In semi-automated charging processes, for example, the driver has to couple a charging plug with an on-board charging socket. In a fully automated charging process, the charging system also takes care of coupling the charging plug with the on-board charging socket.

According to a further aspect of the disclosure, a vehicle arrangement is provided. The vehicle arrangement is used in particular to carry out a method according to the disclosure. For this purpose, the vehicle arrangement has at least one vehicle parked on at least one charging space and at least one automated charging system.

In this case, the vehicle arrangement can have a charging system with a plurality of actuators or robot arms, which can couple a plurality of on-board charging sockets in order to carry out charging processes.

Advantageously, the vehicle can be configured as an exclusively electrically driven vehicle or as a hybrid vehicle, which can be operated electrically as needed and/or in certain situations.

By way of the vehicle arrangement according to the disclosure, a charging request can be recognized as a behavioral pattern through optical and visual detection and an insertion process of the charging plug can then be automated. In order to do so, no communication between the vehicle and the charging robot or the charging system is necessary. This measure allows vehicles already existing in the market to be charged semi-automatically with a mechanical or automated charging flap.

According to an exemplary embodiment, the charging intention is determined based on a manual opening of a charging flap and/or an automated opening of the charging flap and/or a driver leaving the vehicle and/or at least one gesture and/or a voice input. As a result, various interactions between the vehicle and the user or driver can be interpreted as an indication to initiate a charging process by the charging system.

For example, a manual opening of the charging flap can be classified as a charging request using image recognition software of the charging system.

According to a further embodiment, the charging intention is determined by evaluating measurement data from at least one camera of the automated charging system. Based on the received measurement data, at least one behavioral pattern of a driver of the vehicle, a user of the vehicle and/or the vehicle is then detected, which indicates a charging intention. Based on the evaluation of the measurement data, the charging process can be started automatically. In particular, a logic or a controller of the charging system can recognize a certain behavior of the user in order to derive a charging request. This could be, for example, leaving or walking away from the vehicle.

Furthermore, a confirmation through a hand movement or gesture to be defined can also be interpreted as a charging request or a charging intention.

The corresponding behavioral pattern is determined in the controller. The charging process can be ended in an automated manner as soon as a set state of charge is reached, or the charging process is ended by the driver or user.

For example, the charging system of the vehicle arrangement can have several surrounding cameras, which are coupled to image recognition software of the controller. This allows behavioral patterns of the respective users to be analyzed. The respective camera sensors can start recording measurement data when the vehicle enters in order to carry out a behavioral analysis of the user or driver.

According to a further exemplary embodiment, the authentication is carried out manually through an interaction of a driver or user of the vehicle with a terminal of the charging system or through an interaction of the driver or user with at least one input device of the vehicle. For example, if manual authentication is used, this can be done via an operating display or terminal of the charging system.

To start the semi-automatic charging process, the user is provided with a push button or digital button following successful authentication. The start/stop switch can therefore be designed as a button in the operating display or as a manual or physical push button. When the start switch is actuated, the semi-automatic insertion process of the charging plug can begin.

Another way to start the charging process can be implemented using a voice assistant or virtual assistant. This assistant can be configured as a functional component of the terminal of the charging system or as a component of the vehicle. For this purpose, a microphone and loudspeaker unit can be installed at the charging station or in the vehicle. Through the camera sensors of the charging system used and the image processing of the measurement data of the camera sensors, the user's charging intention can be recognized as a behavioral pattern. A voice assistant of the charging system can then establish communication with the user and thus start the automated charging process. Similarly, a disconnection process can be initiated by communicating with the voice assistant of a charging station or the charging system.

According to a further embodiment, the authentication is carried out through an automated interaction of an on-board control device with the charging system. This measure makes it possible, for example, to use an automated authentication procedure so that the user does not have to carry out any further interaction with the charging system terminal.

For automated authentication, for example, a so-called Plug&Charge method can be used. Electricity contract information can already be stored as certificates in the vehicle in order to implement an automatic authentication process between the charging system and the vehicle.

According to a further exemplary embodiment, the behavioral pattern recognition is continued if no authentication is carried out within a predefined period of time after a determined charging intention. For example, as soon as a user opens the on-board charging flap or the charging flap is opened automatically, the image recognition software classifies this as a charging intention and can further monitor the situation at the vehicle. If the user does not authenticate manually within a definable period of time, the charging system can store this accordingly and further analyze the user's behavior with regard to charging intentions.

According to a further embodiment, when the charging process is initiated by the automated charging system, an electrical connection between the charging system and an energy storage device of the vehicle is established in an automated manner by the charging system. In this way, partially automated charging of the vehicle can be realized, in which only the authentication and/or the charging intention by the user is made clear to the charging system.

According to a further exemplary embodiment, in order to establish an electrical connection between an energy storage device of the vehicle and the charging system, a position of a charging socket of the vehicle is detected using measurement data from at least one sensor and actuators for attaching a charging plug are controlled by a controller of the charging system. For example, the environment can be scanned using a camera sensor installed in the charging system and a geometry of the charging socket of the opened charging flap of the vehicle can be recognized through pattern recognition in order to enable exact positioning of the charging plug relative to the on-board charging socket.

Advantageously, a charging process of the vehicle's energy storage unit is ended in an automated manner after reaching a predefined state of charge and/or manually by the action of the driver or user of the vehicle. This measure allows the user to cancel the charging process at any time as needed and put the vehicle into operation. As soon as the charging process is completed, the charging system sends this information to the controller, which then automatically disconnects the charging plug and brings the charging robot or actuator into a designated parking position. The charging process can also be stopped or canceled by the respective user. The start/stop button mentioned above can be actuated again or the charging process can be ended by the vehicle or by a vehicle-specific app.

According to a further aspect of the disclosure, a charging system is provided which is designed to execute a charging process of an energy storage device of an electrically drivable vehicle. The charging system can advantageously be operated at least partially in an automated manner and have at least one charging robot and at least one sensor. The charging robot can be controlled based on measurement data from the at least one sensor so that it can couple a charging plug to an on-board charging socket. For this purpose, the measurement data from the at least one sensor can be received and evaluated by a controller of the charging system, with control commands for controlling the charging robot or a corresponding actuator being generated.

BRIEF DESCRIPTION OF THE SEVERAL VIEWS OF THE DRAWINGS

The disclosure is shown schematically using embodiments in the drawings and is further described with reference to the drawings. In the drawings.

DETAILED DESCRIPTION

Figure 1:
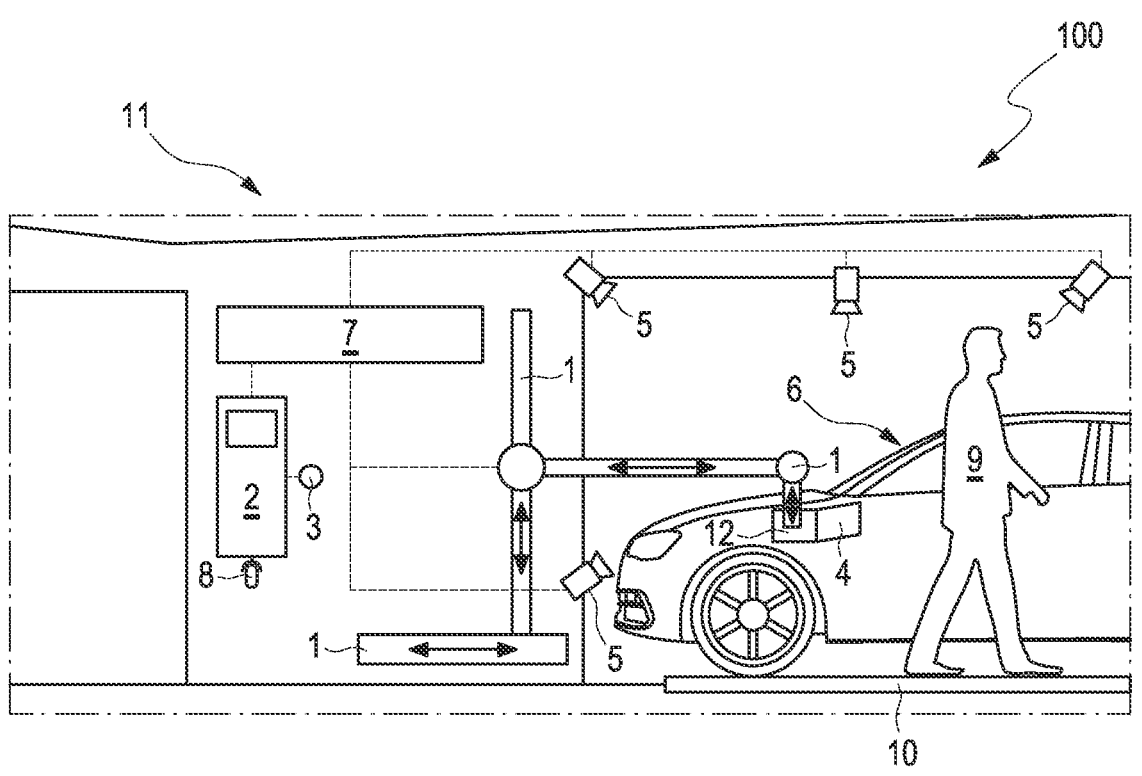
FIG. 1 shows a vehicle arrangement according to an exemplary embodiment of the disclosure.

FIG. 1 shows a vehicle arrangement 100 according to an exemplary embodiment of the disclosure. The vehicle arrangement 100 has a vehicle 6. The vehicle arrangement 100 is used in particular to perform a method according to the disclosure, which is described in more detail in FIG. 2.

In the exemplary embodiment shown, the vehicle arrangement 100 has at least one vehicle 6 parked on at least one charging space 10 and at least one automated charging system 11.

In particular, the vehicle arrangement 100 has a charging system 11 with a plurality of charging robots 1 with actuators or robot arms, which have a plurality of charging plugs (not shown) and can couple a corresponding plurality of on-board charging sockets 12 to perform charging processes. For the sake of clarity, only one charging robot 1 and one vehicle 6 are shown. The charging socket 12 is accessible to the charging system 11 after opening a charging flap 4 and enables charging of a traction battery (not shown) of the vehicle 6.

Advantageously, the vehicle 6 can be configured as an exclusively electrically driven vehicle or as a hybrid vehicle, which can be operated electrically as needed and/or in certain situations.

The charging system 11 has a plurality of sensors 5, which are configured as camera sensors in order to provide measurement data for behavioral pattern recognition. The measured data determined are received and evaluated by a controller 7 of the charging system 11. In one or more implementations, the controller 7 includes at least one processor and at least one memory storing instructions that, when executed by the at least one processor, cause the controller 7 to perform the acts described herein.

To enable manual input, for example for authentication, by a driver or user 9, the charging system 11 has a terminal 2 with an operating display. The terminal 2 can, for example, have physical or digital switching elements 3 in order to make entries and/or to be able to initiate or cancel a charging process of the vehicle 6.

The authentication can be carried out manually by an interaction of the driver 9 of the vehicle 6 with the terminal 2 of the charging system 11 or by an interaction of the driver 9 with at least one input device of the vehicle 6 or the charging system 11. In the exemplary embodiment shown, an input device 8 in the form of a microphone is provided in the area of the terminal 2 for this purpose.

By way of the vehicle arrangement 100 according to the disclosure, a charging request can be recognized as a behavioral pattern through optical and visual detection and an insertion process of the charging plug into the on-board charging socket 12 can then be automated. This takes place without communication between the vehicle 6 and the charging robot 1 or the charging system 11. The arrows illustrate, by way of example, the possible movement sequences of the charging robot 1.

Figure 2:
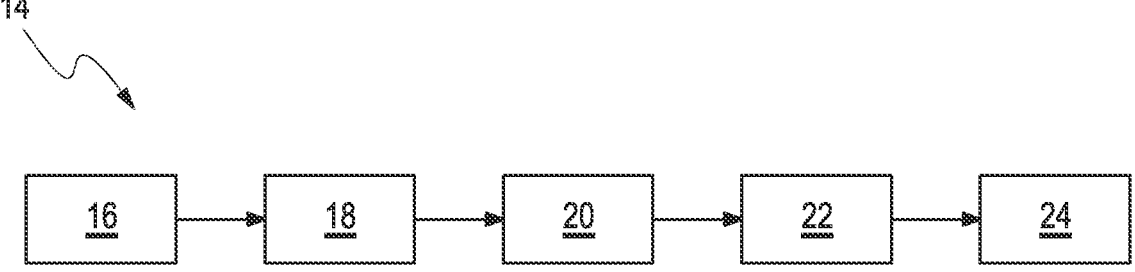
FIG. 2 shows a flow diagram to illustrate a method according to an exemplary embodiment of the disclosure.

FIG. 2 illustrates a method 14 according to an exemplary embodiment according to the disclosure in a schematic flow diagram. Using the method 14, for example, at the beginning of a semi-automated charging process, a user 9 of the vehicle 6 can place 16 said vehicle 6 in a correspondingly specified parking position or a charging space 10 and open 18 the charging flap 4 to release the on-board charging socket 12. The opening 18 of the charging flap 4 takes place manually by the user 9, for example.

After the vehicle 6 has been parked on the charging space 10, a charging intention is determined in an automated manner by the controller 7 using the sensors 5 and a corresponding evaluation of the measurement data from the sensors 5 based on behavioral pattern recognition 20. Through the sensory monitoring of the behavior of the vehicle 6 and/or the driver 9, a charging request or charging intention can be estimated by the controller 7 of the charging system 11. In addition to said opening 18 of the charging flap 4, the driver 9 leaving the vehicle 6 and/or the charging space 10 by can also be interpreted as a charging intention.

In a further step 22, the charging process is authenticated. This can be realized manually by the driver 9 or automatically by the vehicle 6. After authentication has taken place, the charging process 24 is initiated by the automated charging system 11.

German patent application no. 102023106569.6, filed Mar. 16, 2023, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for initiating a charging process of an electrically drivable vehicle by an automated charging system, wherein the vehicle is parked at a charging space, the method comprising:

determining a charging intention of a user in an automated manner based on performing behavioral pattern recognition of a behavioral pattern of the user including at least one movement of the user;

authenticating the charging process; and after the authenticating, initiating the charging process by the automated charging system.

2. The method according to claim 1, wherein the determining the charging intention is based on a manual opening of a charging flap and/or an automated opening of the charging flap and/or a driver leaving the vehicle, and/or at least one gesture and/or a voice input.

3. The method according to claim 1, wherein the charging intention is determined based on measurement data from at least one sensor of the automated charging system.

4. The method according to claim 3, wherein the at least one sensor of the automated charging system includes a camera.

5. The method according to claim 1, wherein the authenticating is performed by an interaction of a driver or user of the vehicle with at least one input device of the vehicle or the automated charging system.

6. The method according to claim 1, wherein the authenticating is performed by an automated interaction of a control device of the vehicle with the automated charging system.

7. The method according to claim 1, wherein the behavioral pattern recognition is continued if the authenticating is not carried out within a predefined period of time after the charging intention is determined.

8. The method according to claim 1, wherein the initiating the charging process by the automated charging system includes establishing an electrical connection between the automated charging system and an energy storage device of the vehicle in an automated manner by the automated charging system.

9. The method according to claim 8, wherein the establishing the electrical connection between the energy storage device of the vehicle and the automated charging system includes detecting a position of a charging socket of the vehicle using measurement data from at least one sensor and controlling actuators that attach a charging plug by a controller of the automated charging system, and ending the charging process of the energy storage device of the vehicle in an automated manner after reaching a predefined state of charge and/or by an act of a driver or user of the vehicle.

10. The method according to claim 1, wherein the at least one movement of the user includes a hand movement or gesture of the user.

11. The method according to claim 1, wherein the charging process is authenticated based on input from a microphone.

12. A vehicle arrangement, comprising:

a vehicle, wherein the vehicle is parked at a charging space; and an automated charging system, wherein the automated charging system includes:

at least one processor, and at least one memory storing instructions that, when executed by the at least one processor, causes the automated charging system to:

determine a charging intention of a user based on performing behavioral pattern recognition of a behavioral pattern of the user including at least one movement of the user;

authenticate a charging process; and after the charging process is authenticated, initiate the charging process.

13. The vehicle arrangement to claim 12, wherein the at least one movement of the user includes a hand movement or gesture of the user.

14. The vehicle arrangement to claim 12, wherein the charging process is authenticated based on input from a microphone.

\* \* \* \* \*